(12) United States Patent  
Wang et al.

(10) Patent No.: US 8,755,801 B2  
(45) Date of Patent: Jun. 17, 2014

(54) METHOD AND ACCESS NODE FOR TRANSMITTING INFORMATION

(75) Inventors: Shengming Wang, Guangdong Province (CN); Jin Xi, Guangdong Province (CN); Lei Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,231

(22) PCT Filed: Jan. 20, 2011

(86) PCT No.: PCT/CN2011/070434  
§ 371 (c)(1),  
(2), (4) Date: Sep. 21, 2011

(87) PCT Pub. No.: WO2012/041023  
PCT Pub. Date: Apr. 5, 2012

(65) Prior Publication Data  
US 2013/0178210 A1    Jul. 11, 2013

(30) Foreign Application Priority Data  
Sep. 29, 2010    (CN) .......................... 2010 1 0503817

(51) Int. Cl.  
*H04W 36/00*    (2009.01)

(52) U.S. Cl.  
USPC ......................................................... 455/436

(58) Field of Classification Search  
USPC ....................................... 455/432.1, 436–448  
See application file for complete search history.

(56) References Cited

U.S. PATENT DOCUMENTS

2009/0219890 A1*    9/2009    Zhang et al. .................. 370/331

FOREIGN PATENT DOCUMENTS

| CN | 101272618 A | 9/2008 |
| CN | 101511079 A | 8/2009 |
| CN | 101527941 A | 9/2009 |
| CN | 101677455 A | 3/2010 |

\* cited by examiner

*Primary Examiner* — Joel Ajayi  
(74) *Attorney, Agent, or Firm* — Banner & Witcoff, Ltd.

(57) ABSTRACT

The present invention discloses a method for information transmission, the method including: in a process of a terminal initial accessing and/or the terminal handing over, an upper level access node belonging to a hierarchical architecture access network notifying a final access node belonging to the same hierarchical architecture access network of information of a mobility management entity (MME) to which the terminal accesses. The present invention also discloses an access node. The present invention makes the final access node acquire the information of the MME to which the terminal accesses so that the final access node can perform X2 handover via the acquired information of the MME.

20 Claims, 3 Drawing Sheets

METHOD AND ACCESS NODE FOR TRANSMITTING INFORMATION

TECHNICAL FIELD

The present invention relates to a wireless cellular communication system, and more particularly, to a method for information transmission and an access node.

BACKGROUND OF THE RELATED ART

The wireless communication system mainly consists of a wireless access network and a core network, where the wireless access network is responsible for providing wireless connection so that the terminal connects to the core network level-by-level; while the core network (also called backbone network) connects the service provider with the access network, as well as the access network with other access networks, and performs unified management on service continuation, billing and mobility, and so on, of the terminal. For example, the Long Term Evolution (LTE) system consists of an Evolved Universal Terrestrial Radio Access Network (E-UTRAN) and an Evolved Packet Core (EPC), as shown in FIG. 1. In the conventional LTE system, nodes in the access network (i.e. the evolved Node B (eNodeB, eNB)) are performed unified layout and deployment by the operator. The eNB, according to the network deployment, directly connects with the core network element such as the Mobility Management Entity (MME) and set up an S1 interface. The eNB can connect with a plurality of MMEs and select a suitable MME for the terminal in the process of the terminal access or handover.

However, with the continuous evolution of the wireless technology, more and more technical scenarios require that the access network nodes are dynamically deployed, and the nodes are even deployed by the users themselves in some scenarios. In order to control the dynamically deployed access nodes, the dynamic access node is often connected to the core network via the upper level static access node to form a hierarchical architecture of the access network. For example, the access network system with the hierarchical architecture can be a home base station system and a relay system technology.

The home base station is one kind of small and low-power base station deployed in indoor places such as the home and the office, and so on, and the main functions of the home base station is to provide the user with higher service rate, reduce high-speed service costs, and to make up for the deficiencies of the existing distributed cellular wireless communication system coverage. Benefits of the home base station comprise: boon, convenience, low-power output, and plug and play.

The users of the home base station access to the core network via the Home eNodeB Access Network (HeNB AN) (as shown in FIG. 2), where the HeNB AN consists of the Home eNodeB (HeNB) and the Home eNodeB Gateway (HeNB GW). The main functions performed by the HeNB GW comprise: dealing with home base station registration and access control, verifying the home base station, and being responsible for exchanging data of the core network and the home base station. Moreover, a Home eNodeB Management System (HeMS) performs operation and maintenance management on the home base station, and configures and controls the home base station according to the operator requirements, and primarily achieves a configuration management function for the HeNB. The configuration management function comprises location information verification, as well as parameter configuration for the HeNB. The parameter configuration is mainly related to the parameter configuration at the Core Network (CN) level, the parameter configuration on the Radio Access Network (RAN) side and the parameter configuration of Radio Frequency (RF). In addition, the HeNB also can adopt architecture of directly connecting to the MME without the HeNB GW.

RELAY or Relay Node (RN) is a radio network node which is used to solve problems of coverage and capacity of the cellular wireless communication system. In the cellular wireless communication system, the wireless coverage of the fixed base station network is limited due to various reasons, for example, reasons, such as a variety of building structures blocking the wireless signal and so on, cause that coverage holes exist inevitably in the wireless network coverage. On the other hand, at the edge area of the cell, due to the weakening of the wireless signal strength and interference of adjacent cells, the quality of communication is poor and the wireless transmission error rate increases when the UE is at the cell edge. The RN deployment can increase the data rate coverage, group mobility, temporary network deployment, throughput at the edge area of the cell and the coverage of new area. The RN relays data via the wireless link between the RN and other network nodes, and the working principle of the RN is shown as FIG. 3. In FIG. 3, the UE served directly by the base station is called a Macro UE, the UE served by the RELAY is called a RELAY UE. The RELAY UE accesses to the RELAY via the access link, and the latter relays data of the RELAY UE on the uplink and downlink via a backhaul link. Currently, the RELAY discussed in the 3rd Generation Partnership Project (3GPP) standards organization has all functions of the Macro eNB, and can set up the cell independently. The Macro eNB that provides the RELAY with the backhaul link is called Donor eNB (DeNB) of the RN, the interface between the RELAY and the DeNB is called a Un interface. From the signaling connection, a S1 connection is established between the RELAY and the DeNB, the DeNB acts as a S1 proxy of the RELAY, and the DeNB provides the control plane and user plane signaling connection (S1-C, S1-U) between the core network and itself via the S1 connection between the core network and itself. The RELAY attaches as a UE in the initialization process and acquires the Packet Data Network Connection (PDN), and on the connection, the RELAY sets up a service layer connection with its own Operation Administration and Maintenance (OAM) system, and downloads the configuration parameters.

From the above technical description of the home base station and the relay node, it can be seen that, the HeNB can access to the core network via the HeNB GW, and the RELAY accesses to the core network via the DeNB. In the hierarchical architecture, the signaling connection (i.e. S1 connection) that usually exists between the access network and the core network exists between the final access nodes (HeNB or RELAY) and the upper level access nodes (HeNB GW or DeNB); wherein, the final access node only has one S1 connection with the upper level access node, while the upper level access node might connect to different MMEs via a plurality of S1 connections. When the user terminal accesses to the final access node, the upper level access node chooses the appropriate MME for the terminal. However, the final access node cannot acquire the information of the MME to which the terminal accesses.

CONTENT OF THE INVENTION

Based on the above problem, the present invention proposes a method for information transmission and an access node to make the final access node acquire the information of the MME to which the terminal accesses.

To solve the aforementioned problem, the present invention provides a method for information transmission, and the method comprises:

in a process of a terminal initial accessing and/or the terminal handing over, an upper level access node belonging to a hierarchical architecture access network notifying a final access node belonging to the same hierarchical architecture access network of information of a mobility management entity (MME) to which the terminal accesses.

Wherein: in the process of the terminal initial accessing, the step of the upper level access node notifying the final access node of the information of the MME to which the terminal accesses comprises:

in the process of the terminal initial accessing, after the upper level access node receives an initial context setup request message sent by the MME to which the terminal accesses, the information of the MME is carried in an initial access signaling sent by the upper level access node to the final access node.

Wherein: the initial access signaling comprises one or more of the following messages: an initial context setup request message, an evolved radio access bearer setup request message, a user context modification request message, and a preset downlink dedicated message.

Wherein: in the process of the terminal handing over, the step of the upper level access node notifying the final access node of the information of the MME to which the terminal accesses comprises:

in the process of the terminal handing over, after the upper level access node receives a first handover request message sent by the MME to which the terminal accesses, the information of the MME is carried in a second handover request message sent by the upper level access node to the final access node.

The method also comprises:

after the final access node receives the information of the MME sent by the upper level access node, recording the information of the MME to which the terminal accesses.

The method also comprises:

when the final access node determines that the terminal needs to be performed a X2 handover, and determines that the X2 handover is able to be initiated according to the information of the MME to which the terminal accesses, sending a third handover request message to the target access node, and the information of the MME is carried in the third handover request message.

Wherein: the step of the final access node determining that a X2 handover is able to be initiated according to the information of the MME to which the terminal accesses comprises: if the final access node detects that the information of the MME exists in a pre-acquired MME resource pool information connected with the target access node, determining that the X2 handover is able to be initiated.

The method also comprises:

if the target access node is the final access node in the hierarchical architecture access network, then, after the target access node receives the third handover request message, the target access node sending a path switch message to the upper level access node that is served by the local target access node, and the information of the MME is carried in the message.

Wherein: the information of the MME comprises one or more of the following information: a MME identification, a MME load instruction, and a S1 signaling identification assigned by the MME to the terminal.

Wherein: the final access node is a home base station, and the upper level access node is a home base station gateway; or the final access node is a relay node, and the upper level access node is a macro base station that provides a backhaul link to the relay node.

To solve the aforementioned problem, the present invention provides an access node, and the access node is an upper level access node, and the final access node accesses to a core network via the upper level access node, wherein, the upper level access node is configured to: in a process of a terminal initial accessing and/or the terminal handing over, notify the final access node of information of a mobility management entity (MME) to which the terminal accesses.

Wherein: the upper level access node is configured to, in the process of the terminal initial accessing, notify the final access node of the information of the MME to which the terminal accesses according to the following way: in the process of the terminal initial accessing, after the upper level access node receives an initial context setup request message sent by the MME to which the terminal accesses, carry the information of the MME in an initial access signaling sent to the final access node, the initial access signaling comprises one or more of the following messages: an initial context setup request message, an evolved radio access bearer setup request message, a user context modification request message, and a preset downlink dedicated message.

Wherein: the upper level access node is configured to, in the process of the terminal handing over, notify the final access node of the information of the MME to which the terminal accesses according to the following way: in the process of the terminal handing over, after the upper level access node receives a first handover request message sent by the MME to which the terminal accesses, carry the information of the MME in a second handover request message sent to the final access node.

Wherein: the information of the MME comprises one or more of the following information: a MME identification, a MME load instruction, and a S1 signaling identification assigned by the MME to the terminal.

Wherein: the final access node is a home base station, and the upper level access node is a home base station gateway; or the final access node is a relay node, and the upper level access node is a macro base station that provides a backhaul link to the relay node.

In summary, a method for information transmission and an access node proposed by the present invention enable the final access node to acquire the information of the MME to which the terminal accesses, so that the final access node can perform the X2 handover via the acquired MME information.

PREFERRED EMBODIMENTS OF THE PRESENT INVENTION

The present invention proposes a method for acquiring the information of the MME to which the terminal accesses, mainly involved in the method for the final access node acquiring the information of the MME to which the terminal managed by the final access node is connected in the hierarchical architecture access network, and the core idea is that: the upper level access node notifies the final access node of the information of the MME node to which the terminal accesses.

To make the description of the present invention more explicit, the embodiments are used to describe the present invention in more detail in the following. It should be noted that, in the case of no conflict, the embodiments in the present application and the features of the embodiments can be combined randomly.

The "information of the MME" in the embodiments comprises at least one of the following items: MME identification (including the MME code, identification of the group in which the MME is located, and identification of the public land mobile network (PLMN) in which the MME is located); a MME load instruction; an S1 signaling identification assigned by the MME to the terminal. The first embodiment and the second embodiment provide two methods for the final access node acquiring the "information of the MME" to which the managed terminal accesses, and the third embodiment describes how the final access node uses the acquired "information of the MME".

The First Embodiment

Figure 1:
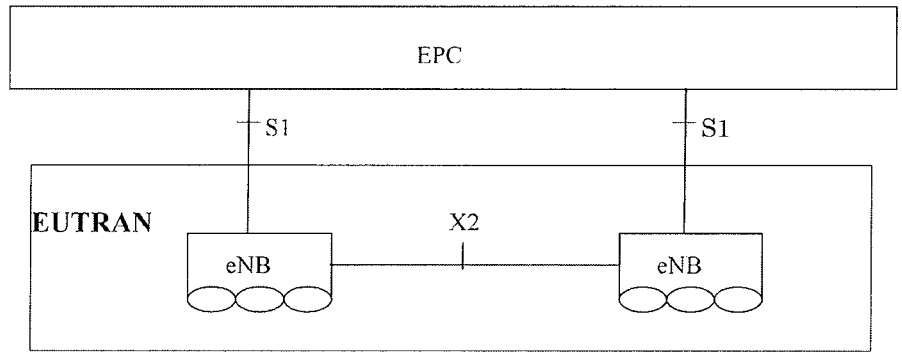
FIG. 1 is a schematic diagram of a LTE access network E-UTRAN network architecture.
Figure 2:
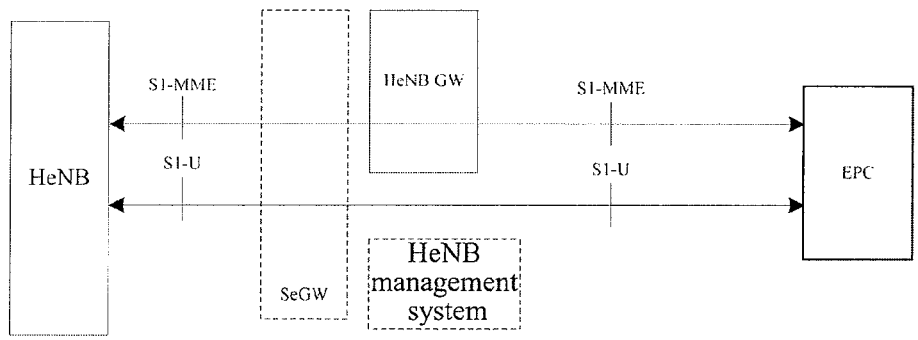
FIG. 2 is a structure diagram of a HeNB network.
Figure 3:
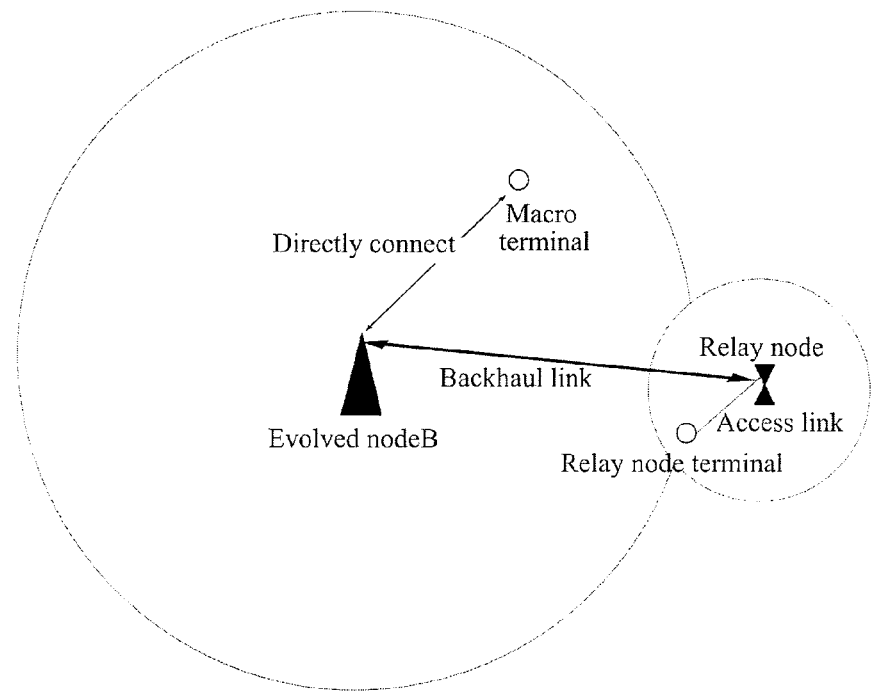
FIG. 3 is an architectural diagram of a wireless relay node network.
Figure 4:
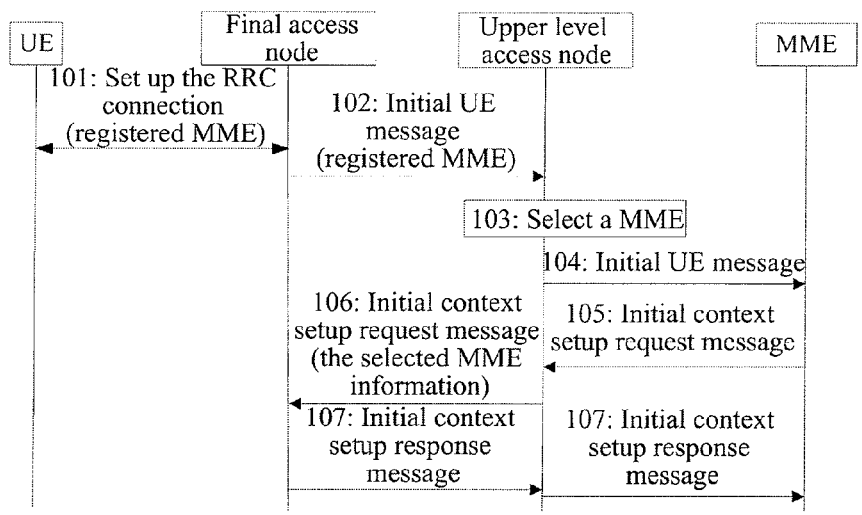
FIG. 4 is a flow chart of acquiring MME information in accordance with the first embodiment of the present invention.

This embodiment describes, after the terminal initially accesses to the network, at the time of the terminal setting up the context for the first time, a process flow of the upper level access node notifying the final access node of the "information of the MME" to which the terminal accesses; and as shown in FIG. 4, the specific flow is described as follows:

step 101: the terminal and the final access node set up a Radio Resource Control (RRC) protocol connection.

If the terminal has previously registered to a certain MME, the terminal notifies the final access node of the MME (registered MME) identification in a RRC signaling message (RRC Connection Setup Complete);

Step 102: the final access node sends an INITIAL UE MESSAGE to the upper level access node, and if the final access node acquires the MME identification previously registered by the terminal in step 101, the MME identification is notified to the upper level access node in that message.

Step 103: the upper level access node selects an appropriate MME for the terminal to access.

The selection principle is the same as that in the prior art: if the upper level access node has a connection with the MME in which the terminal previously registered, the upper level access node preferably selects that MME; if the upper level access node has no connection with the MME in which the terminal previously registered, or the terminal does not provide the previously registered MME identification, the upper level access node selects a MME according to the load sharing principle.

Step 104: the upper level access node sends the INITIAL UE MESSAGE to the selected MME.

Step 105: after the MME receives the INITIAL UE MESSAGE, if the UE is allowed to access, the MME sends the INITIAL CONTEXT SETUP REQUEST message to the upper level access node.

Step 106: the upper level access node sends the initial access signaling to the final access node, carries the information of the MME in the initial access signaling;

the initial access signaling can comprise: the INITIAL CONTEXT SETUP REQUEST message or the downlink dedicated message (e.g., the Evolved-Radio Access Bearer (E-RAB) SETUP REQUEST message or the UE CONTEXT MODIFICATION REQUEST message) or a preset downlink dedicated message, and notify the final access node of the "information of the MME" selected for the terminal in step 103.

Step 107: after the final access node receives the message sent in step 106, the final access node records the "information of the MME" of the terminal, and returns the appropriate response message (such as, the INITIAL CONTEXT SETUP RESPONSE message, the E-RAB SETUP RESPONSE message, or the UE CONTEXT MODIFICATION RESPONSE message) to the MME through the upper level access node, so as to complete the signaling process.

With the aforementioned flow, it is completed that the final access node acquires the information of the MME to which the terminal actually accesses via the initial access, and the corresponding information needed for node selection is provided for the subsequent X2 handover.

Figure 5:
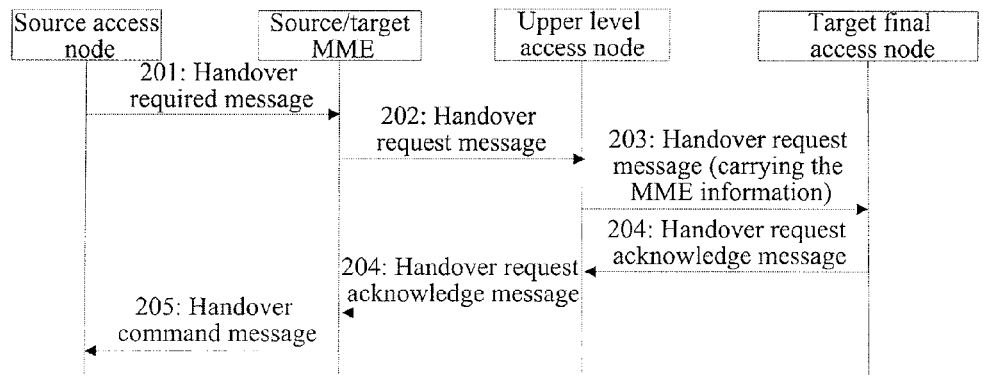
FIG. 5 is a flow chart of acquiring MME information in accordance with the second embodiment of the present invention.

The second embodiment: this embodiment describes that after the terminal accesses to the network via the source access node, the terminal accesses to one target final access node through handover. When the terminal hands over, the process flow of the upper level access node notifying the target final access node of the "information of the MME" of the terminal access is shown as FIG. 5; the invention points emphasizes on steps 203, 204, and the specific flow is described as follows:

step 201: the terminal and the source access node set up the RRC connection. The source access node selects an appropriate MME for the terminal to access, and the step herein is the same as the steps 101-103 in the first embodiment. The terminal initiates the service via the source access node and enters into the connectivity state; and due to reasons such as the terminal mobility or the wireless signal change in the cell in which the terminal is located, the source access node determines the cell to be set up in order to hand the terminal over to the target final access node according to the measurement report of the terminal. The source access node of the terminal sends a handover required message to the MME;

step 202: the source MME determines that it needs to forward the signaling to the target upper level access node serving for the target final node according to the information in the target final access node identification (Target ID) carried in the message; and according to the MME load and geographical deployment, the source MME might select a new MME which connects with the target upper level access node and forwards the handover required message and the terminal context to the new MME. After the target MME receives the handover required message, the target MME determines that it needs to forward the signaling to the target upper level access node according to the information in the target final access node identification (Target ID) carried in the message, and sends a handover request message to the upper level access node;

step 203: after the upper level access node receives the handover request message from the target MME, the upper level access node constructs a handover request and adds the target "information of the MME" of the terminal access into that message, and then sends it to the target final access node.

Step 204: after the target final access node receives the handover request message, records the "information of the MME" of the terminal access, and returns a Handover Request Acknowledge message to the target MME via the upper level access node;

step 205: after the MME receives the Handover Request Acknowledge message, the MME sends a Handover Command message to the source access node.

The source access node in the embodiment might be the final access node which is connected to the MME via the upper level access node in the "hierarchical architecture" mentioned in the background, or might be the access node which is directly connected to the MME in the "flat architecture".

With the aforementioned flow, it is completed that the final access node acquires the "information of the MME" to which the terminal accesses via the handover flow, and the corresponding information needed for node selection is provided for the subsequent X2 handover.

In the X2 handover process, it needs to maintain the serving MME that hands the terminal over having no change. Thus, the target base station needs to know the MME to which the terminal accesses at the source base station after receiving the handover request, and continues the dedicated S1 process of the terminal via that MME. In the prior art, the source base station notifies the target base station of the Glabally Unique MME Identifier (GUMMEI) of the terminal, and the target base station determines the MME according to the GUMMEI. However, in the hierarchical architecture access network system, the final access node does not know the MME to which the terminal accesses, and also cannot notify the target base station of the information, thereby causing that the X2 handover cannot be carried out. Therefore, according to the present invention, the final access node is able to acquire the information of the MME to which the terminal accesses, and to carry out the X2 handover according to the acquired MME information.

Figure 6:
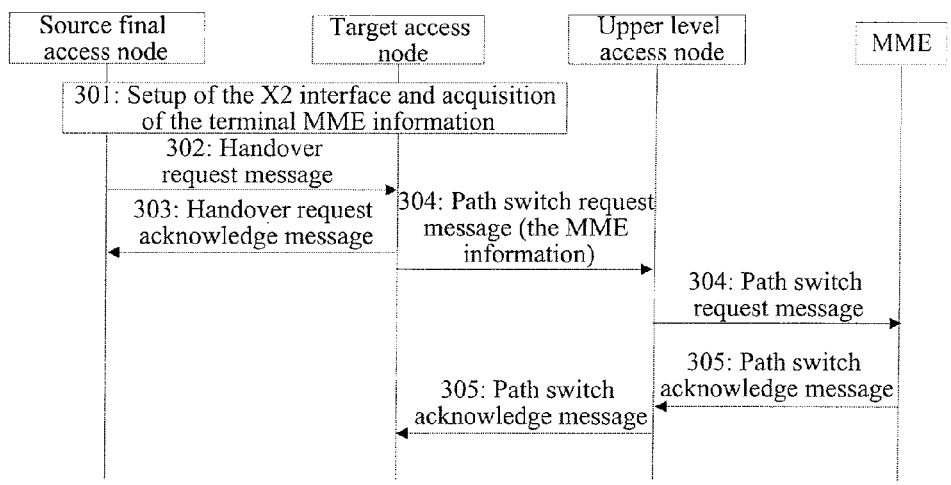
FIG. 6 is a flow chart of acquiring MME information and executing an X2 handover in accordance with the third embodiment of the present invention.

The third embodiment: this embodiment describes, after the final access node acquires the information of the MME to which the terminal accesses, how to transfer and use the information in the X2 handover process. For convenience of description, it is promised that an X2 direct interface is set up between the source final access node and the target access node, and the source final access node connects with the MME via the upper level access node. As shown in FIG. 6, the specific flow is described as follows:

step 301: the source final access node accesses to the core network via the upper level access node, and in the process of registration of the source final access node and the upper level access node (S1 Setup), the upper level access node notifies the final access node of the connected MME resource pool information. The source final access node sets up the X2 interface with the target access node according to the configuration. In the process of the X2 interface setup (X2 Setup) and the eNB Configuration Update, the source final access node and the target access node exchange with each other their connected MME resource pool information.

With the method described in the first embodiment or second embodiment, the terminal accesses to the source final access node, and the source final access node maintains the "information of the MME" of the terminal access.

Step 302: due to reasons such as the terminal movement or the wireless signal change in the cell in which the terminal is located, the source final access node determines that it needs to hand the terminal over to the cell set up by the target access node according to the measurement report of the terminal; at this time, the source final access node compares the "information of the MME" to which the terminal accesses acquired in step 301 with the MME resource pool connected with the target access node and acquired in step 301, if the MME to which the terminal accesses exists in the MME resource pool of the target access node, determines that the X2 handover can be initiated. The source final access node sends a handover request message to the target access node, and the message carries the "information of the MME" of the terminal access.

Step 303: after the target access node receives the handover request message, it sends a handover request acknowledge message to the source final access node to complete the handover preparation process.

Step 304: after the terminal hands over to the target access node, the target access node sends a path switch request message to the MME, to which the terminal indicated in the handover request in step 302 accesses, so as to update the user plane connection.

If the target access node also accesses to the core network via the upper level access node, the target access node sends a path switch message to the upper level access node serving for the local access node, and the message carries the "information of the MME" to which the terminal accesses; after the upper access node receives the path switch request message, selects the MME according to the "information of the MME", and sends a path switch request message to the selected MME;

step 305: after the MME receives the path switch request message, it sends a path switch acknowledge message to the target access node via the upper level access node.

With the aforementioned description, the direct interface X2 handover is completed.

The embodiment also provides an access node, the access node is an upper level access node, and the final access node accesses to the core network via the upper level access node, wherein, the upper level access node is configured to: in the process of the terminal initial access and/or the terminal handover, notify the final access node of the information of the MME to which the terminal accesses.

Wherein: the upper level access node is configured to, in the process of the terminal initial accessing, notify the final access node of the information of the MME to which the terminal accesses according to the following way: in the process of the terminal initial accessing, after the upper level access node receives an initial context setup request message sent by the MME to which the terminal accesses, carry the information of the MME in an initial access signaling sent to the final access node, the initial access signaling comprises one or more of the following messages: an initial context setup request message, an evolved radio access bearer setup request message, a user context modification request message, and a preset downlink dedicated message.

Wherein: the upper level access node is configured to, in the process of the terminal handing over, notify the final access node of the information of the MME to which the terminal accesses according to the following way: in the process of the terminal handing over, after the upper level access node receives a first handover request message sent by the MME to which the terminal accesses, carry the information of the MME in a second handover request message sent to the final access node.

Wherein: the information of the MME comprises one or more of the following information: a MME identification, a MME load instruction, and a S1 signaling identification assigned by the MME to the terminal.

Wherein: the final access node is a home base station, and the upper level access node is a home base station gateway; or the final access node is a relay node, and the upper level access node is a macro base station that provides a backhaul link to the relay node.

The embodiment also provides a system for information transmission, and the system comprises the upper level access node and the final access node, and the final access node accesses to the core network via the upper level access node, wherein, the upper level access node is configured to: in the process of the terminal initial access and/or the terminal handover, notify the final access node of the information of the MME to which the terminal accesses.

Wherein: the upper level access node is configured to, in the process of the terminal initial accessing, notify the final access node of the information of the MME to which the terminal accesses according to the following way: in the process of the terminal initial accessing, after the upper level access node receives an initial context setup request message sent by the MME to which the terminal accesses, carry the information of the MME in an initial access signaling sent to the final access node, the initial access signaling comprises: the initial context setup request message, the evolved radio access bearer setup request message, the UE context modification request message, and the preset downlink dedicated message.

Wherein: the upper level access node is configured to, in the process of the terminal handing over, notify the final access node of the information of the MME to which the terminal accesses according to the following way: in the process of the terminal handing over, after the upper level access node receives a first handover request message sent by the MME to which the terminal accesses, carry the information of the MME in a second handover request message sent to the final access node.

Wherein:

the final access node is configured to: after receiving the information of the MME of the terminal access, record the information of the MME of the terminal access, and when determining that it needs to perform the X2 handover to the terminal, and determining that the X2 handover can be initiated according to the information of the MME of the terminal access, send the third handover request message to the target access node, and the message carries the information of the MME.

Wherein,

The final access node is configured to determine that the X2 handover can be initiated according to the following method: if the final access node detects that the information of the MME exists in a pre-acquired MME resource pool information connected with the target access node, determining that the X2 handover is able to be initiated.

Wherein, if the target access node is the final access node in the hierarchical architecture access network, The target access node is configured to: after receiving the third handover request message, send a path switch message to the upper level access node that serves for the local target access node, and the path switch message carries the information of the MME.

Wherein: the information of the MME comprises one or more of the following information: a MME identification, a MME load instruction, and a S1 signaling identification assigned by the MME to the terminal.

Wherein: the final access node is a home base station, and the upper level access node is a home base station gateway; or the final access node is a relay node, and the upper level access node is a macro base station that provides a backhaul link to the relay node.

It can be understood by those skilled in the art that all or part of steps in the above-mentioned method can be fulfilled by programs instructing the relevant hardware components, and the programs can be stored in a computer readable storage media such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present invention is not limited to any specific form of the combination of the hardware and software.

The above description is only the preferred embodiments of the present invention, of course, the present invention has a variety of other embodiments, and Without departing from the spirit and essence of the present invention, those skilled in the field should make various modifications and variations according to the present invention. All these types of modifications and variations should belong to the scope of the appending claims of the present invention.

INDUSTRIAL APPLICABILITY

The present invention makes the final access node acquire the information of the MME to which the terminal accesses so that the final access node can perform the X2 handover via the acquired information of the MME.

What is claimed is:
1. A method for information transmission, comprising:
in a process of a terminal initial accessing and/or the terminal handing over, an upper level access node belonging to a hierarchical architecture access network notifying a final access node belonging to the same hierarchical architecture access network of information of a mobility management entity (MME) to which the terminal accesses.
2. The method of claim 1, wherein, in the process of the terminal initial accessing, the step of the upper level access node notifying the final access node of the information of the MME to which the terminal accesses comprises:
in the process of the terminal initial accessing, after the upper level access node receives an initial context setup request message sent by the MME to which the terminal accesses, the information of the MME is carried in an initial access signaling sent by the upper level access node to the final access node.
3. The method of claim 1, wherein: in the process of the terminal handing over, the step of the upper level access node notifying the final access node of the information of the MME to which the terminal accesses comprises:
in the process of the terminal handing over, after the upper level access node receives a first handover request message sent by the MME to which the terminal accesses, the information of the MME is carried in a second handover request message sent by the upper level access node to the final access node.
4. The method of claim 1, further comprising:
after the final access node receives the information of the MME sent by the upper level access node, recording the information of the MME to which the terminal accesses.

5. The method of claim 4, further comprising:
when the final access node determines that the terminal needs to be performed a X2 handover, and determines that the X2 handover is able to be initiated according to the information of the MME to which the terminal accesses, sending a third handover request message to the target access node, and the information of the MME is carried in the third handover request message.

6. The method of claim 5, further comprising:
if the target access node is the final access node in the hierarchical architecture access network, then, after the target access node receives the third handover request message, the target access node sending a path switch message to the upper level access node that serves for the local target access node, and the information of the MME is carried in the message.

7. The method of claim 1, wherein: the information of the MME comprises one or more of the following information: a MME identification, a MME load instruction, and a S1 signaling identification assigned by the MME to the terminal.

8. The method of claim 1, wherein,
the final access node is a home base station, and the upper level access node is a home base station gateway; or
the final access node is a relay node, and the upper level access node is a macro base station that provides a backhaul link to the relay node.

9. An access node, wherein, the access node is an upper level access node, and a final access node accesses to a core network via the upper level access node, wherein,
the upper level access node is configured to: in a process of a terminal initial accessing and/or the terminal handing over, notify the final access node of information of a mobility management entity (MME) to which the terminal accesses.

10. The access node of claim 9, wherein:
the upper level access node is configured to, in the process of the terminal initial accessing, notify the final access node of the information of the MME to which the terminal accesses according to the following way: in the process of the terminal initial accessing, after the upper level access node receives an initial context setup request message sent by the MME to which the terminal accesses, carry the information of the MME in an initial access signaling sent to the final access node,
the initial access signaling comprises one or more of the following messages: an initial context setup request message, an evolved radio access bearer setup request message, a user context modification request message, and a preset downlink dedicated message.

11. The access node of claim 9, wherein:
the upper level access node is configured to, in the process of the terminal handing over, notify the final access node of the information of the MME to which the terminal accesses according to the following way: in the process of the terminal handing over, after the upper level access node receives a first handover request message sent by the MME to which the terminal accesses, carry the information of the MME in a second handover request message sent to the final access node.

12. The access node of claim 9, wherein:
the information of the MME comprises one or more of the following information: a MME identification, a MME load instruction, and a S1 signaling identification assigned by the MME to the terminal.

13. The access node of claim 9, wherein:
the final access node is a home base station, and the upper level access node is a home base station gateway; or
the final access node is a relay node, and the upper level access node is a macro base station that provides a backhaul link to the relay node.

14. The method of claim 2, further comprising:
after the final access node receives the information of the MME sent by the upper level access node, recording the information of the MME to which the terminal accesses.

15. The method of claim 14, further comprising:
when the final access node determines that the terminal needs to be performed a X2 handover, and determines that the X2 handover is able to be initiated according to the information of the MME to which the terminal accesses, sending a third handover request message to the target access node, and the information of the MME is carried in the third handover request message.

16. The method of claim 15, further comprising:
if the target access node is the final access node in the hierarchical architecture access network, then, after the target access node receives the third handover request message, the target access node sending a path switch message to the upper level access node that serves for the local target access node, and the information of the MME is carried in the message.

17. The method of claim 3, further comprising:
after the final access node receives the information of the MME sent by the upper level access node, recording the information of the MME to which the terminal accesses.

18. The method of claim 17, further comprising:
when the final access node determines that the terminal needs to be performed a X2 handover, and determines that the X2 handover is able to be initiated according to the information of the MME to which the terminal accesses, sending a third handover request message to the target access node, and the information of the MME is carried in the third handover request message.

19. The method of claim 18, further comprising:
if the target access node is the final access node in the hierarchical architecture access network, then, after the target access node receives the third handover request message, the target access node sending a path switch message to the upper level access node that serves for the local target access node, and the information of the MME is carried in the message.

20. The method of claim 2, wherein: the information of the MME comprises one or more of the following information: a MME identification, a MME load instruction, and a S1 signaling identification assigned by the MME to the terminal.

* * * * *